United States Patent
Simard et al.

(10) Patent No.: US 9,941,973 B2
(45) Date of Patent: Apr. 10, 2018

(54) PHASE MODULATOR WITH REDUCED RESIDUAL AMPLITUDE MODULATION

(71) Applicant: Ciena Corporation, Hanover, MD (US)

(72) Inventors: Alexandre D. Simard, Québec (CA); Yves Painchaud, Québec (CA); Michel Poulin, Québec (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/249,563

(22) Filed: Aug. 29, 2016

(65) Prior Publication Data
US 2018/0062755 A1  Mar. 1, 2018

(51) Int. Cl.
*H04B 10/548* (2013.01)
*G02F 1/225* (2006.01)
*G02F 1/21* (2006.01)

(52) U.S. Cl.
CPC ......... *H04B 10/548* (2013.01); *G02F 1/2257* (2013.01); *G02F 2001/212* (2013.01); *G02F 2001/213* (2013.01)

(58) Field of Classification Search
CPC . H04B 10/532; G01B 9/02091; G01B 9/0201
See application file for complete search history.

(56) References Cited

U.S. PATENT DOCUMENTS

| | | | |
|---|---|---|---|
| 5,748,814 A | 5/1998 | Painchaud et al. | |
| 6,590,665 B2 | 7/2003 | Painchaud et al. | |
| 6,678,049 B1 | 1/2004 | Painchaud | |
| 6,937,793 B2 | 8/2005 | Lelievre et al. | |
| 6,941,044 B2 | 9/2005 | Painchaud et al. | |
| 7,142,292 B2 | 11/2006 | Painchaud | |
| 7,167,293 B2 | 1/2007 | Piede | |
| 7,230,712 B2 | 6/2007 | Cannon | |
| 8,406,621 B2 | 3/2013 | Painchaud et al. | |
| 8,619,824 B2 | 12/2013 | Ayotte et al. | |
| 8,639,073 B2 | 1/2014 | Pelletier et al. | |
| 8,948,549 B2 | 2/2015 | Picard et al. | |
| 9,310,185 B2 * | 4/2016 | Lloret Soler | G01B 9/02091 |
| 2004/0008413 A1 | 1/2004 | Trepanier et al. | |

(Continued)

OTHER PUBLICATIONS

Simard, Alexandre D. et al.; Impact of Sidewall Roughness on Integrated Bragg Gratings, 2010 Optical Society of America, pp. 1-2.

(Continued)

*Primary Examiner* — Dzung Tran
(74) *Attorney, Agent, or Firm* — Clements Bernard Walker PLLC; Christopher L. Bernard; Lawrence A. Baratta, Jr.

(57) ABSTRACT

A phase modulator with reduced Residual Amplitude Modulation includes a main path; a correction path; a first coupler configured to split, at a first ratio, an input to the main path and the correction path; and a second coupler configured to combine outputs from the main path and the correction path and to split the combined outputs, at a second ratio, with a first output comprising an output of the phase modulator with the reduced Residual Amplitude Modulation. The correction path can include a correction signal with a proper amplitude and phase that, when combined with an output signal from the main path by the second coupler, cancels the Residual Amplitude Modulation from the output signal.

19 Claims, 7 Drawing Sheets

(56) References Cited

U.S. PATENT DOCUMENTS

| | | | | |
|---|---|---|---|---|
| 2006/0008223 A1* | 1/2006 | Gunn, III | ................ | G02F 1/025 |
| | | | | 385/129 |
| 2006/0171013 A1* | 8/2006 | Piede | .................... | G02F 1/2257 |
| | | | | 359/279 |
| 2014/0185125 A1* | 7/2014 | Kanter | ...................... | G02F 1/21 |
| | | | | 359/279 |
| 2014/0334764 A1* | 11/2014 | Galland | .................. | G02F 1/225 |
| | | | | 385/3 |
| 2015/0132013 A1* | 5/2015 | Vermeulen | ......... | H04B 10/5053 |
| | | | | 398/184 |

OTHER PUBLICATIONS

Simard, Alexandre D. et al.; Integrated Bragg Gratings in Curved Waveguides, 2010 IEEE, pp. 726-727.
Weng, Tsui-Wei (Lily) et al.; Silicon Optical Modulators, Massachusetts Institute of Technology, Cambridge, MA, p. 1.

* cited by examiner

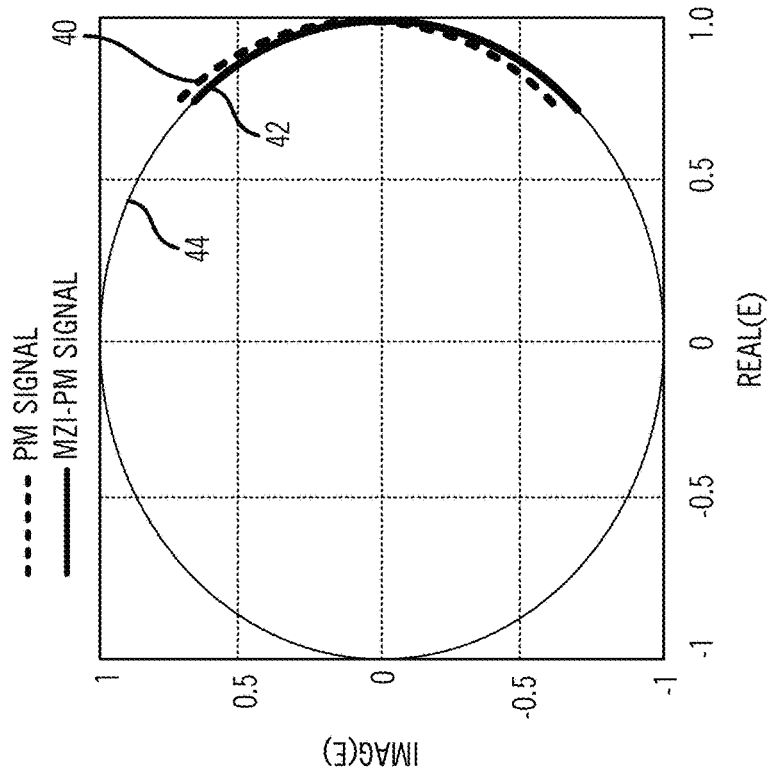
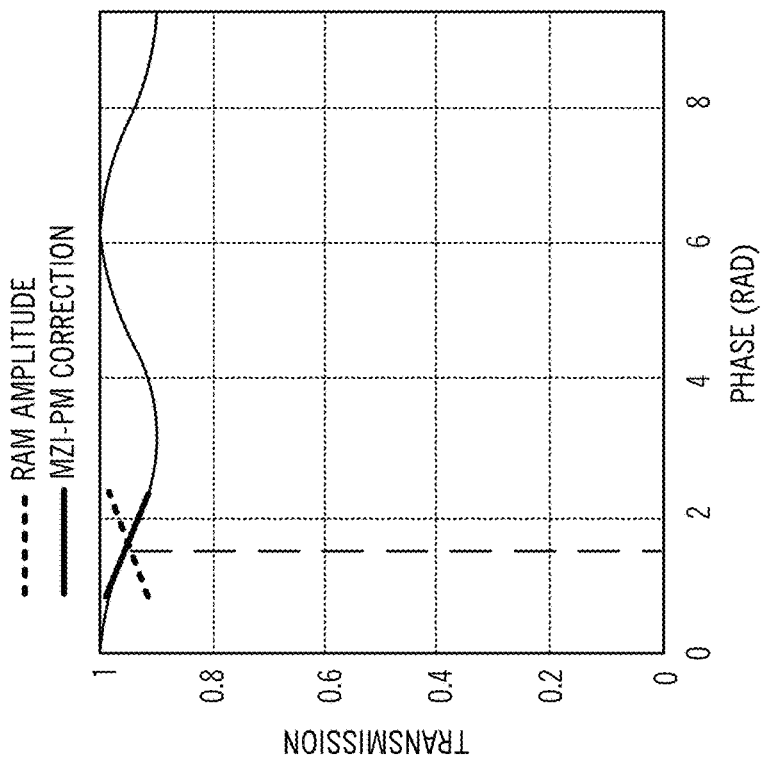
FIG. 4B
FIG. 4A

PHASE MODULATOR WITH REDUCED RESIDUAL AMPLITUDE MODULATION

FIELD OF THE DISCLOSURE

The present disclosure generally relates to optical systems and methods. More particularly, the present disclosure relates to a phase modulator with reduced Residual Amplitude Modulation (RAM).

BACKGROUND OF THE DISCLOSURE

In silicon photonics (SiP), most high-speed devices are designed using PN-junctions. The variation of the carrier density within the waveguide, which can be controlled by varying the applied voltage, modifies the effective index of the optical mode. Thus, a PN junction can be used to create a high-speed optical phase modulator (PM) which is also often incorporated into a Mach-Zehnder Interferometer (MZI) to create an amplitude modulator. However, as described by Soref's equations (such as described in R. Soref and B. Bennett, "Electrooptical effects in silicon," IEEE J. Quantum Electron., vol. 23, no. 1, pp. 123-129, 1987, the contents of which are incorporated by reference), charge carriers not only modify the silicon index of refraction but also its absorption coefficient. As a result, SiP PMs have a significant impact on the amplitude of the transmitted wave as well. Thus, a substantial amount of undesired Residual Amplitude Modulation (RAM) is added to the optical signal. A PM can be used to encode data in both the phase and the amplitude of an optical signal. If the information is encoded directly in the phase, the RAM is a power instability that can decrease the performance of data transmission. If the information is encoded in the amplitude (e.g., using a PM in an MZI interferometer), the RAM will be converted in chirp which is also damaging for telecom system.

Phase modulators are inherently imperfect components in the fact that they always produce some amount of amplitude modulation as well. For example, lithium niobate ($LiNbO_3$) modulators are generally accompanied by a residual amplitude modulation (RAM) of a few tenths of a percent. However, in the silicon photonic technology, phase modulation is typically realized using a PN-junction operating either in a depletion-mode (carrier depletion mode) or a forward bias mode. In both cases, free-carriers are being modulated, which leads to a RAM of several percent, about 10%/rad, thus degrading a lot the performance of systems making use of such phase modulators, and taking away the benefits of using low-cost silicon photonics chips to realize those systems.

BRIEF SUMMARY OF THE DISCLOSURE

In an exemplary embodiment, a phase modulator with reduced Residual Amplitude Modulation includes a main path; a correction path; a first coupler configured to split, at a first ratio, an input to the main path and the correction path; and a second coupler configured to combine outputs from the main path and the correction path and to split the combined outputs, at a second ratio, with a first output including an output of the phase modulator with the reduced Residual Amplitude Modulation. The correction path can include a correction signal with a proper amplitude and phase that, when combined with an output signal from the main path by the second coupler, cancels the Residual Amplitude Modulation from the output signal. The correction path can be unmodulated. The correction path can be modulated with a correction signal that is a fraction of a modulation signal from the main path. The correction signal can be adjusted based on a servo locking configuration that controls a strength of a correction signal in the correction path to minimize the Residual Amplitude Modulation in an output signal from the main path. The first ratio and the second ratio can be adjusted to compensate the Residual Amplitude Modulation. The first ratio can be set such that enough power passes through the correction path to enable a correction signal that compensates completely the Residual Amplitude Modulation caused by the main path. A correction signal can be applied in the correction path which is proportional to the main signal in the main path, and wherein the amplitude and phase of the correction signal are adjusted based on monitoring. The first ratio and the second ratio can be adjusted to compensate the Residual Amplitude Modulation, without modulation on the correction path. The phase modulator can be implemented in silicon photonics. The phase modulator can use a Mach-Zehnder Interferometer. The phase modulator can use a Fabry-Perot Interferometer. The phase modulator can be a micro-ring resonator. The main path can include a phase modulator formed by a PN-junction operating in either a depletion mode and a forward bias mode.

In another exemplary embodiment, a method implemented in a phase modulator for reduced Residual Amplitude Modulation includes splitting an input to a main path and a correction path at a first ratio; performing phase modulation on a main signal in the main path; and combining a correction signal from the correction path with the main signal and providing a combined output signal at a second ratio, to provide an output of the phase modulator with the reduced Residual Amplitude Modulation. The correction signal can have a proper amplitude and phase that, when combined with the main signal, cancels the Residual Amplitude Modulation. The correction signal can be one of i) unmodulated, and ii) adjusted based on a servo-locking system that controls a strength of the correction signal in the correction path to minimize the Residual Amplitude Modulation in an output signal from the main path. The first ratio can be set such that enough power passes through the correction path to enable a correction signal that compensates completely the Residual Amplitude Modulation caused by the main path. The method can further include monitoring the output; and adjusting amplitude and phase of the correction signal based on monitoring, wherein the correction signal is proportional to the main signal from the main path.

In a further exemplary embodiment, a silicon photonics integrated, Mach-Zehnder interferometer-based phase modulator with reduced Residual Amplitude Modulation includes a first coupler adapted to receive an input and split the input at a first ratio; a main arm with a PN-junction operating in either a depletion mode and a forward bias mode adapted to receive one output of the first coupler; a correction arm adapted to receive another output of the first coupler; and a second coupler adapted to combine outputs from the main arm and the correction arm and to split the combined outputs, at a second ratio, with a first output including an output of the phase modulator with the reduced Residual Amplitude Modulation.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 4A and 4B illustrate transmission of a well-calibrated MZI-PM illustrating RAM caused by the PM and an associated correction signal (FIG. 4A) and normalized real and imaginary components of the optical field coming out of the PM and the MZI-PM (FIG. 4B);

DETAILED DESCRIPTION OF THE DISCLOSURE

Again, in various exemplary embodiments, the present disclosure relates to a Phase Modulator (PM) with reduced Residual Amplitude Modulation (RAM). Generally, the present disclosure uses an interferometer (i.e., any mechanism to modify the amplitude of an optical signal) to reduce the RAM. Thus, the present disclosure enables a reduction in the amount of RAM in a phase modulated beam generated from a non-ideal phase modulator by combining to the phase modulated beam another phase modulated beam having the proper amplitude and phase which will cancel the RAM of the original beam. The RAM plaguing the initial beam can be canceled if the correction beam is optimally configured (optimal amplitude and phase). In an exemplary embodiment, the correction beam is generated using a small fraction of a phase shifted replica of the original signal. This interference scheme can be accomplished using a Mach-Zehnder configuration. Other types of interferometers such as a Fabry-Perot interferometer or a micro-ring resonator are also contemplated.

Again, PM RAM is caused by the variation of the charge carrier concentration which modifies the absorption coefficient of the silicon. The present disclosure reduces the undesired RAM using a correction mechanism adding another amplitude modulation that will counteract the RAM. The correction mechanism can be created using any kind of interferometer. As described herein, the present disclosure is illustrated with reference to a PM using a Mach-Zehnder interferometer (MZI) although a Fabry-Perot interferometer, a micro-ring resonator, or another physical implementation could also be used.

Advantageously, the present disclosure presents mechanisms to reduce/compensate for RAM created by the variation of the carrier absorption, with an optical interferometer. As silicon photonic optical modulators are always based on a change of the effective refractive index through a change in the carrier density, the present disclosure can be used therewith to minimize a large amount of RAM generated therein. The correction beam can be determined through a servo-locking scheme which adjusts the strength of the compensation signal (correction electrical signal) in the correction arm (i.e., the compensation signal can be controlled to ensure long term RAM minimization).

Mach-Zehnder Interferometer

Figure 1:
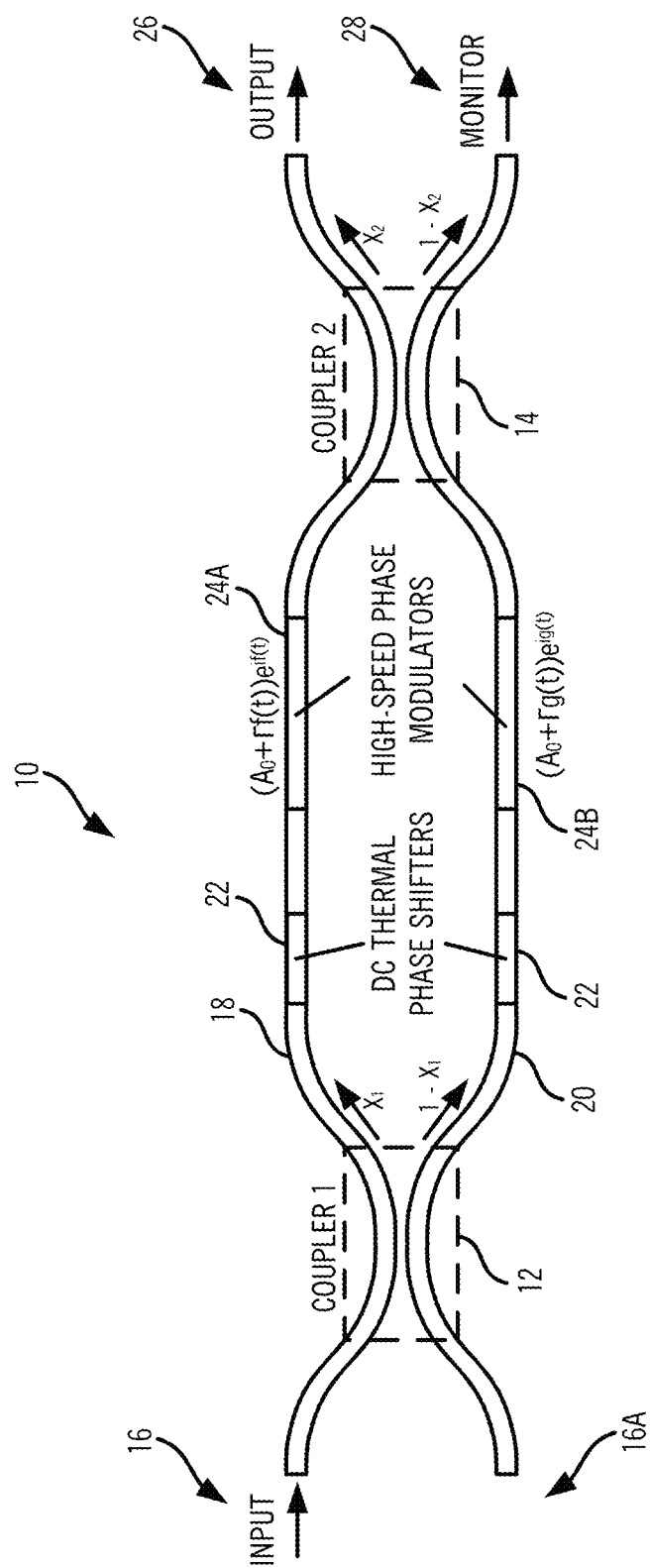
FIG. 1 illustrates a Mach-Zehnder interferometer (MZI) with RAM correction.

Referring to FIG. 1, in an exemplary embodiment, a diagram illustrates a Mach-Zehnder interferometer (MZI) 10 with RAM correction. The MZI 10 includes two couplers 12, 14 (characterized by intensity splitting ratio $X_1$ and $X_2$, respectively). The coupler 12 receives an input 16 and splits the input 16 based on the splitting ratio of $X_1$ to two arms 18, 20 including a modulator arm 18 (a main optical path) and a correction arm 20 (a correction optical path). Each arm 18, 20 includes a Direct Current (DC) phase-shifter (DC-PS) 22 (such as a thermal PS) and one high-speed phase modulator (PM) 24. The DC-PS 22 allows adjustment of the phase difference ($\phi_0$) between the two arms 18, 20. Since originating from the same physical mechanism, the ratio ($\Gamma$) of the amplitude modulation to the phase modulation is the same for both arms 18, 20 although they are modulated differently, for example with phase modulation functions $f(t)$ and $g(t)$, respectively. It is assumed that both of them have identical average attenuation ($A_0$) resulting from the absorption of the PN-junction. Specifically, an output of the PM 24A can be expressed as $(A_0+\Gamma f(t))e^{if(t)}$ and an output of the PM 24B can be expressed as $(A_0+\Gamma g(t))e^{ig(t)}$. With the systems and methods described herein, the proper adjustment of parameters associated with the couplers 12, 14, the DC-PS 22, and the PM 24 allow the optical output 26 to have a phase modulation with reduced/negligible amplitude modulation.

The complex normalized optical fields at the two input ports of the 2×2 coupler 12 can be written as $$E_{in} = \begin{bmatrix} 1 \\ 0 \end{bmatrix}$$

where the upper matrix element refers to input 16 and the lower matrix element refers to the unused input 16A. After the first coupler 12, the optical fields can be expressed as $$E_{s1out} = \begin{bmatrix} \sqrt{X_1} \\ i\sqrt{1-X_1} \end{bmatrix}.$$

Before the second coupler 14, the optical fields can be expressed as $$E_{s2in} = \begin{bmatrix} \sqrt{X_1(A_0 + \Gamma f(t))}\, e^{if(t)} \\ i\sqrt{(1-X_1)(A_0 + \Gamma g(t))}\, e^{i\phi_0 + ig(t)} \end{bmatrix}.$$

At the second coupler 14, the optical fields can be expressed as $$E_{s2in} = \begin{bmatrix} \sqrt{X_2} & i\sqrt{1-X_2} \\ i\sqrt{1-X_2} & \sqrt{X_2} \end{bmatrix} \begin{bmatrix} \sqrt{X_1(A_0 + \Gamma f(t))}\, e^{if(t)} \\ i\sqrt{(1-X_1)(A_0 + \Gamma g(t))}\, e^{i\phi_0 + ig(t)} \end{bmatrix}.$$

Finally, the optical field at the output ports is given by $$E_{out} = \begin{bmatrix} \sqrt{X_1 X_2 (A_0 + \Gamma f(t))}\, e^{if(t)} - \sqrt{(1-X_1)(1-X_2)(A_0 | \Gamma_g(t))}\, e^{i\phi_0 + ig(t)} \\ i\sqrt{X_1(1-X_2)(A_0 + \Gamma f(t))}\, e^{if(t)} + i\sqrt{(1-X_1)X_2(A_0 | \Gamma_g(t))}\, e^{i\phi_0 + ig(t)} \end{bmatrix} \quad (1)$$

To reduce the RAM at the output 26 port of interest, the time variation of $E_{out}E^*_{out}$ needs to be suppressed, which is given by $$E_{out}E^*_{out} = X_1 X_2 (A_0 + \Gamma f(t)) + (1-X_1)(1-X_2)(A_0 + \Gamma_g(t)) -$$

$$2\sqrt{\frac{(1-X_1)(1-X_2)X_1 X_2(A_0 + \Gamma f(t))}{(A_0 + \Gamma_g(t))}} \cos(f(t) - g(t) - \phi_0)$$

$$E_{out}E^*_{out} = I_0 + I(t)$$

Figure 2:
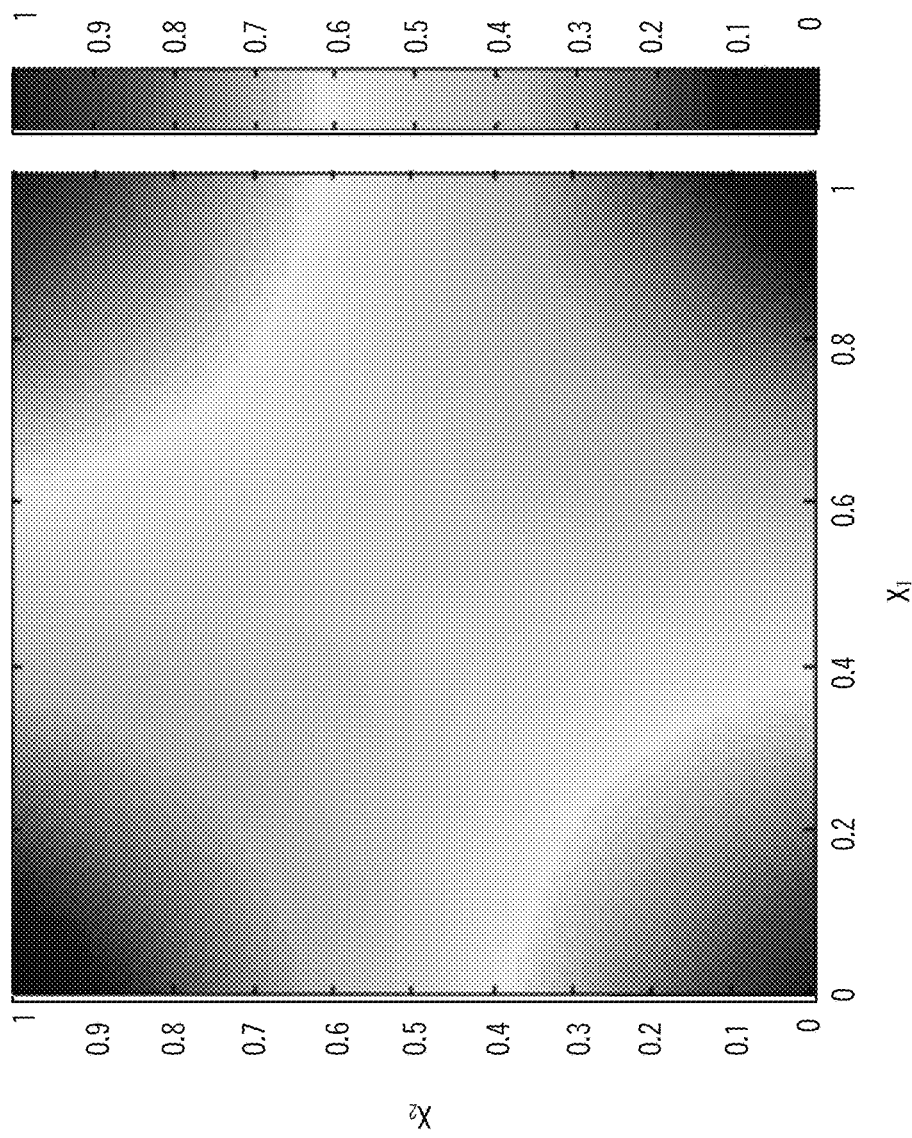
FIG. 2 illustrates excess loss of the MZI of FIG. 1 as a function of the coupler splitting ratios.

The time-independent term, $I_0$, given by $$I_0 = A_0(X_1 X_2 + (1-X_1)(1-X_2)),$$

scales from 0 to 1 and represents an extra loss term in the system compared to a simple PM. The ratio $I_0/A_0$ is illustrated in FIG. 2 which is a graph of the excess loss of the MZI 10 as a function of the couplers 12, 14 splitting ratios. Without loss of generality, it can be seen that to minimize the excess loss, $X_1$ and $X_2$ should be as large as possible ($X_1 \rightarrow 1$ and $X_2 \rightarrow 1$). This involves that one of the two arms 18, 20 of the MZI 10 becomes the main optical path, i.e., the modulator arm 18, and the other arm becomes the correction path, i.e., the correction arm 20. A secondary transmission port can be used as a monitoring port 28 to adjust the operation point of the MZI 10 when it is embedded in more complex optical circuits.

The remaining time dependent term (I(t)), given by $$I(t) = X_1 X_2 A_0 [\Gamma_A(f(t)) + F_X g(t)) - \quad (2)$$

$$2\sqrt{F_X(1+\Gamma_A f(t))(1+\Gamma_A g(t))} \cos(f(t) - g(t) - \phi_0)]$$

where $$F_X = \frac{(1-X_1)(1-X_2)}{X_1 X_2} \text{ and } \Gamma_A = \frac{\Gamma}{A'_o},$$

should be equal to 0 to suppress the RAM. It is interesting to point out that Fx is the parameter describing the MZI 10 while $\Gamma_A$ is the RAM of a single PM. For a fabricated device, $X_1$, $X_2$, $\Gamma$ and $A_0$ are fixed by the fabrication, the PM is driven by f(t) (main path), and the RAM is corrected by g(t). Numerical solutions for g(t) can be obtained by solving I(t)=0 numerically. Under certain assumptions, simplifications of equation (2) can be obtained which results in simple and comprehensive solutions.

Specifically, although the RAM is fairly high in SiP PN-junction PM, $\Gamma_A$ is still much smaller than 1. As a result, $$\Gamma_A(f(t) + F_X g(t)) \cong 2\sqrt{F_X} \cos(f(t) - g(t) - \phi_0)$$

Furthermore, as mentioned above, the objective is to find a solution without too much excess loss ($X_1 \rightarrow 1$ and $X_2 \rightarrow 1$), leading to $F_X \ll 1$ which gives $$\Gamma_A f(t) \cong 2\sqrt{F_X} \cos(f(t) - g(t) - \phi_0).$$

If the cosine term is rewritten as a sine term, $$\Gamma_A f(t) \cong 2\sqrt{F_X} \sin\left(f(t) - g(t) - \phi_0 + \frac{\pi}{2}\right)$$

and as a first approximation for a small argument, $$\Gamma_A f(t) \cong 2\sqrt{F_X}\left(f(t) - g(t) - \phi_0 + \frac{\pi}{2}\right).$$

Thus, $$g(t) \cong \left(1 - \frac{\Gamma_A}{2\sqrt{F_X}}\right) f(t) - \phi_0 + \frac{\pi}{2}$$

Assuming that f(t) does not have a DC component, it is clear that $\phi_0$ must be equal to $$\frac{\pi}{2}$$

to remove the DC component in g(t). Thus, $$g(t) \cong \left(1 - \frac{\Gamma_A}{2\sqrt{F_X}}\right) f(t) = \chi f(t).$$

Figure 3:
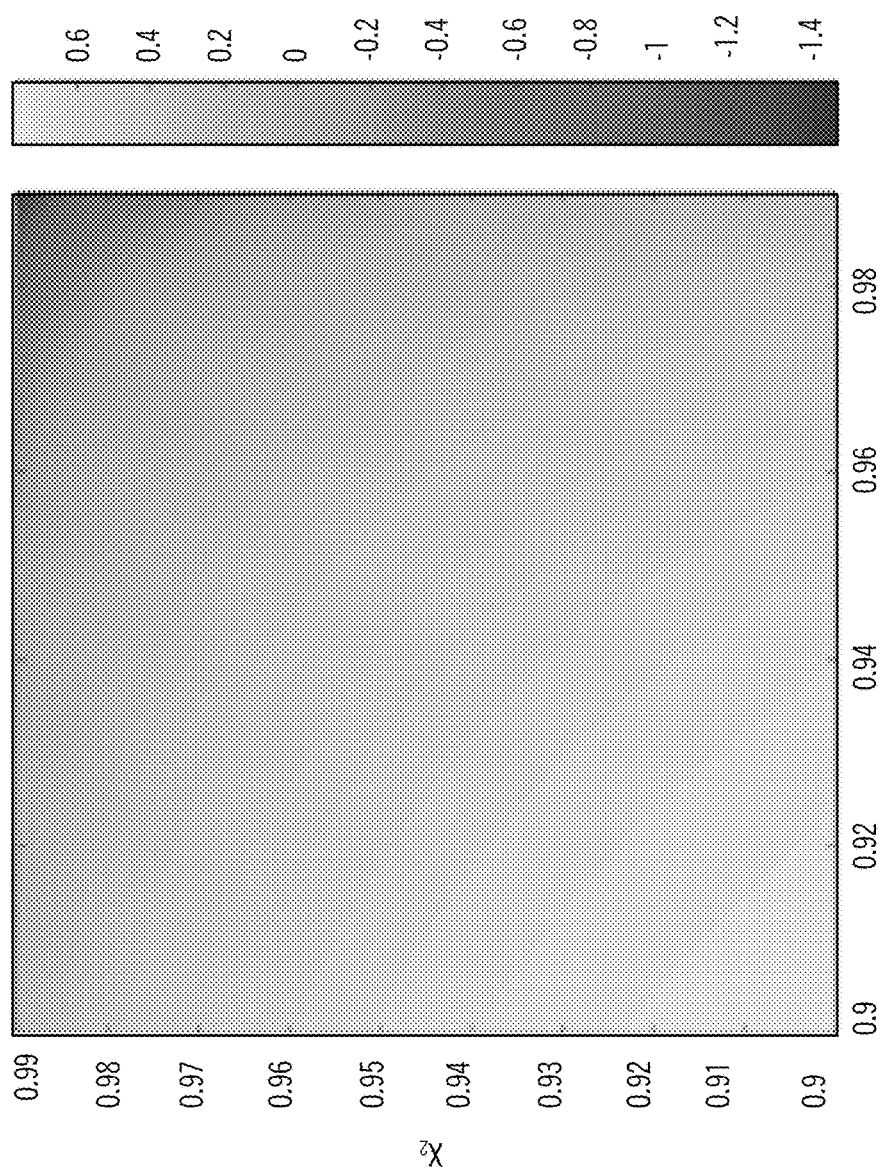
FIG. 3 illustrates $\chi$ as a function of the splitting ratios of the couplers for a specific phase modulator.

This equation is very interesting from a practical point of view since having the correction factor g(t) directly proportional to the main Radio Frequency (RF) signal f(t) is much easier to generate. Thus, the proportionality factor between the phase modulating signal f(t) and the correction factor g(t), $\chi$, is given by $$\chi = 1 - \frac{\Gamma_A}{2}\sqrt{\frac{X_1 X_2}{(1-X_1)(1-X_2)}}. \quad (3)$$

which only depends on the MZI splitting ratio and on the individual PM RAM ($\Gamma_A$). FIG. 3 is a graph of $\chi$ as a function of the splitting ratios of the couplers for a specific phase modulator. It can be seen that for every $X_1$ value, there is an $X_2$ value where $\chi$ changes sign, meaning that there exist approximations of the solutions where no RF correction signal is required to reduce the MZI-PM RAM. This can be achieved using a MZI built using two couplers having appropriate coupling ratio. To achieve such situation in SiP, couplers with tunable coupling ratio can be used. Such situation can be particularly interesting for high-speed applications where maintaining RF signal integrity is difficult to achieve.

When $\chi=0$, the relationship between the coupling ratios that allows this passive RAM reduction is $$X_2 = \frac{1 - X_1}{1 + \left(\frac{\Gamma_A^2}{4} - 1\right) X_1} \quad (4)$$

Quantification of the RAM is going to be made in the following sections in a more rigorous way. If both couplers are desired to be equal, $X=X_1=X_2$, equation (4) gives $$X = \frac{1}{1 + \frac{\Gamma_A}{2}}$$

Referring to FIGS. 4A and 4B, in an exemplary embodiment, graphs illustrate the transmission of a well-calibrated MZI-PM illustrating the RAM caused by the PM and an associated correction signal (FIG. 4A) and normalized real and imaginary components of the optical field coming out of the PM and the MZI-PM (FIG. 4B). FIG. 4A provides a visualization of the functioning principles of the MZI-PM. The idea is to operate the MZI-PM where the amplitude of the transmission slope of the MZI is maximal ($\phi_0 = (2N+1)\pi/2$ where $N \in Z$). Furthermore, by properly adjusting the splitting ratios of the couplers 12, 14, the amplitude modulation induced by the interferometer can be matched to (with a sign inversion) the RAM created by the PM and thus compensate it. To illustrate the effect on the optical wave, the real and imaginary parts of the output optical field of a typical SiP PM 40 and of a MZI-PM 42 (which includes the correction described herein) are illustrated in FIG. 4B. It can be seen that the PM 40 signal is tilted compared to a RAM-less unitary circle 44. However, when the PM is included in a properly adjusted MZI-PM 42, the amplitude modulation is removed.

This simple way to visualize the compensation represents only one specific case (passive RAM reduction). There are actually two other distinct approaches in addition to the passive RAM reduction to compensate the RAM: complete RAM removal and active RAM reduction. These three cases are discussed in the following.

For complete RAM removal, if enough power is sent through the bottom arm 20 of the MZI 10, there is always a solution g(t) that compensates completely the RAM induced by the phase modulation in the top arm 18. So, if one can generate the proper correction function, the RAM will be fully compensated. However, the solution g(t) might have non-linear dependencies to $f(t)$ which involve complex drivers that might be required to operate the structure.

However, in most cases, g(t) is close to being proportional to $f(t)$ and the RAM can be greatly reduced (active RAM reduction). As a result, the RF signal $f(t)$ can be split, and both PMs can be driven with similar signals (i.e., one being proportional to the other). In this situation, the RAM reduction is typically between 10-20 dB. The amplitude of the signal g(t) as well as $\phi_0$ must however be adjusted. This optimization can be performed by monitoring the optical power of the combined beams (or part of it using a tap coupler), such as via the monitoring port 28, and by adjusting the drive signal strength in the correcting path until RAM is minimized. Regarding the phase difference between the beams before their recombination, this can be achieved using standard techniques. Those two adjustments could be done in a "set and forget" fashion.

Now, aging and drifts in those initial settings and/or changes made to the amount of phase modulation in the main beam could result in new conditions that would no longer minimize the RAM in such open-loop configuration (i.e., using a "set and forget" approach to the initial tuning of the device). As such, it could also be useful to ensure long-term minimization of the RAM by using a servo-locking loop. This loop could correct the strength of the driving signal in the correction arm 20 path, and would correct the relative phase between the two interfering beams (using well-known techniques in the field). An exemplary embodiment of the locking loop is described in FIG. 23.

Finally, RAM can be compensated in a passive way. For every PM, there is a family of MZI (defined by the splitting ratio $X_1$ and $X_2$) that allows reducing the RAM induced by an imperfect PM (defined by $A_0$ and $\Gamma$) by 10-20 dB without a correction signal (i.e., the solution g(t)=0). To achieve such configuration, the output splitting ratio must be properly adjusted as a function of the input splitting ratio and the PM characteristics ($A_0$ and $\Gamma$ resulting in a well-calibrated MZI. This situation is illustrated in FIG. 4A). The RAM created by the PM in one arm is compensated by the interferometer if its splitting ratios are well adjusted. Such a situation can be particularly interesting for high-speed applications where maintaining RF signal integrity is difficult to achieve. In this situation, a feedback loop could be realized with an active control over the splitting ratio of the output couplers. Such tunable splitting ratio could be obtained with two 50-50 couplers with a DC phase control in one arm. This configuration is interesting since applying a RF signal g(t) is not necessary.

Numerical Solution

To demonstrate the techniques described herein, simulations are performed to solve equation (2) for g(t) for two specific cases. Afterward, the solution is inserted into equation (1) to analyze the resulting amplitude of the optical signal at the main output. Although this works for arbitrary $f(t)$, for these examples, an excitation function $f(t)$ having a sinusoidal shape with $\pi/2$ peak-to-peak amplitude is used for simplicity and illustration. In the following, the simulations are displayed over one period of $f(t)$. $A_0$ and $\Gamma$ have been fixed to 0.03 and 0.6 respectively which results in 5% RAM, a reasonable value for a SiP modulator. The difference between the two cases is the splitting ratio of the MZI couplers. The first case represents a situation where the active RAM reduction with the approximate solution works well while the second case represents a situation where the passive RAM reduction can be used. In both cases, the exact numerical solution allows a complete removal of the RAM.

Figure 5B:
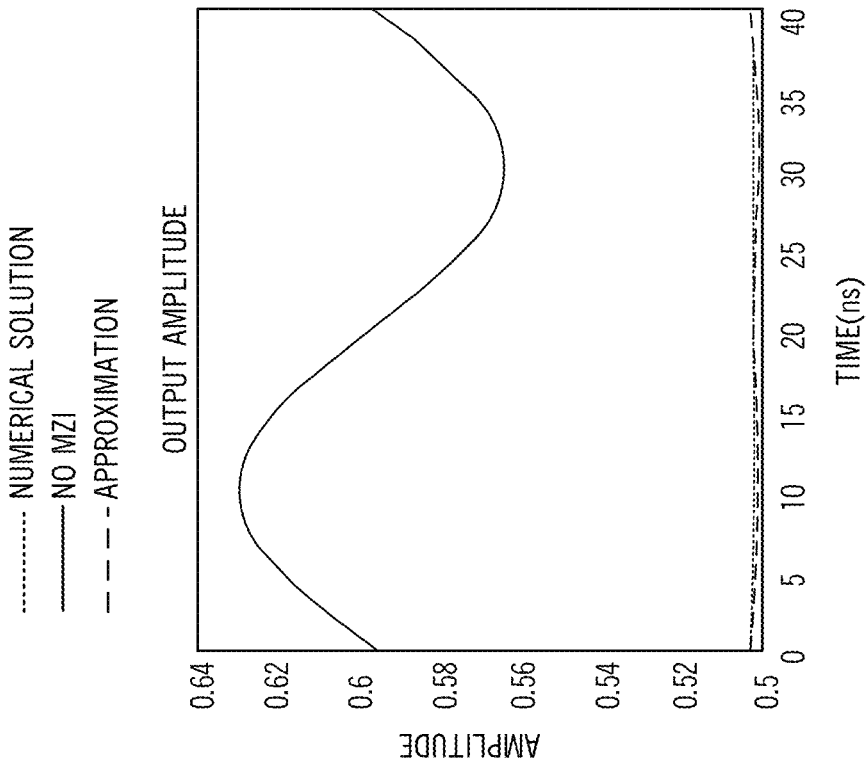
FIGS. 5A and 5B illustrate an excitation function, a numerical solution as well as an approximation of the solution as a function of normalized time (FIG. 5A) and output amplitudes of the exact numerical solution and an approximate solution (FIG. 5B)
Figure 5A:
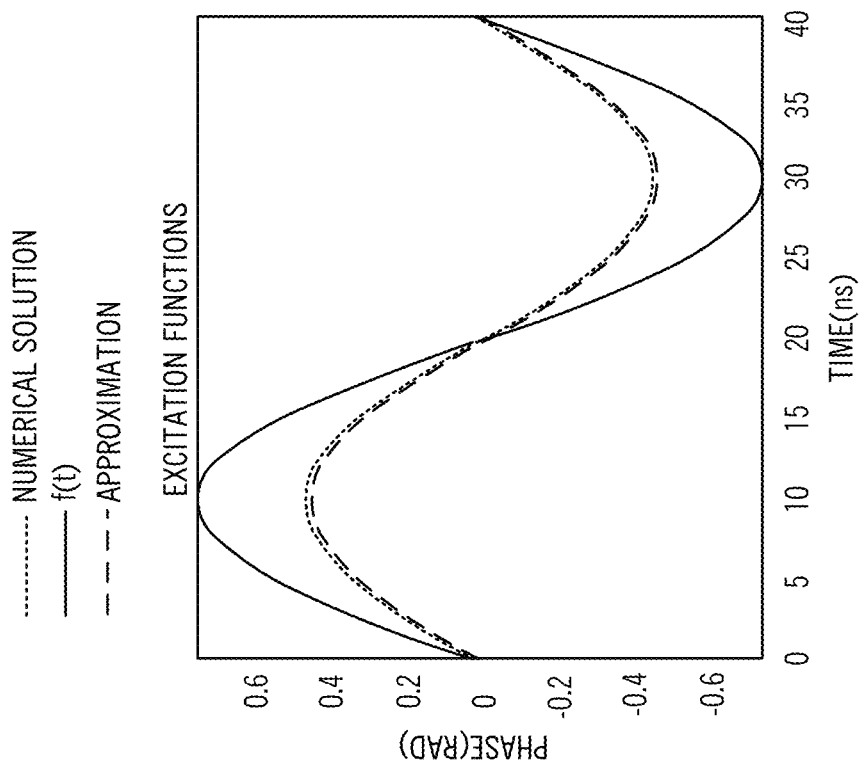
Figure 6A:
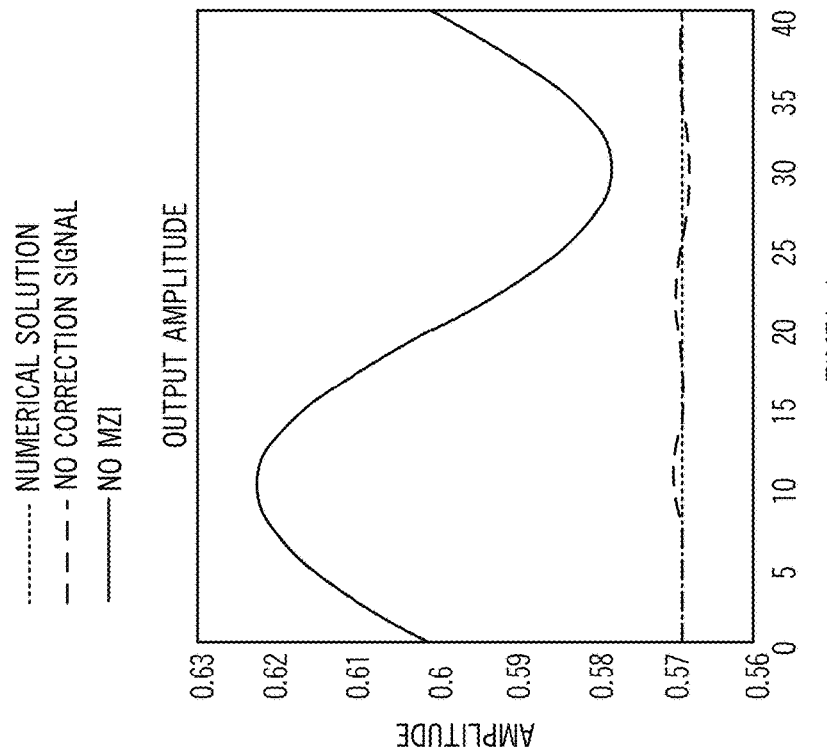
FIGS. 6A and 6B illustrate another example of an excitation function, a numerical solution as well as an approximation of the solution as a function of normalized time (FIG. 6A) and output amplitudes of the exact numerical solution and an approximate solution (FIG. 6B.
Figure 6B:
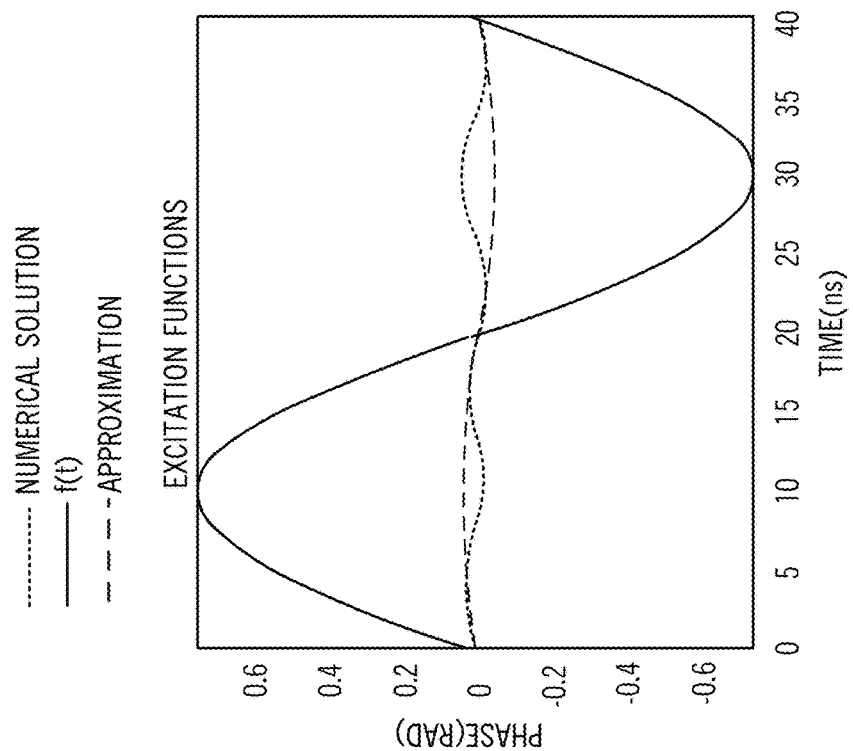

Referring to FIGS. 5A, 5B, 6A, and 6B, in an exemplary embodiment, graphs illustrate an excitation function, a numerical solution as well as an approximation of the solution as a function of normalized time (FIGS. 5A and 6A) and output amplitudes of the exact numerical solution and an approximate solution (FIGS. 5B and 6B). In the first case, $X_1 = X_2 = 0.94$, FIG. 5A shows the exact numerical solution and the approximate solution as a function of normalized time while FIG. 5B shows the output amplitude for the exact numerical solution and for the approximate solution. As expected, the exact numerical solution cancels the RAM. For the approximate solution, it can be seen that the residual RAM is very small, showing that using a correction signal of the form $\chi f(t)$ is a very efficient way to reduce the RAM. Finally, the MZI-PM introduces, as expected, some optical losses; 0.52 dB in this situation. This value agrees well with the analytical derivation described herein (FIG. 2).

In the second case, $X_1 = X_2 = 0.974$ and represents a situation where the passive RAM reduction can be used. FIG. 6A shows the exact numerical solution and the approximate solution as a function of normalized time while FIG. 6B shows the output amplitude for the exact numerical solution and for the passive RAM reduction scheme. In this situation (FIGS. 6A and 6B), the splitting ratios are much closer to one. As a result, compared to FIGS. 5A and 5B, it can be seen that the overall loss in this situation is reduced to 0.22 dB. However, the shape of the solution is not proportional to $f(t)$ anymore which means that the generation of g(t) is much more complicated. However, it can be seen from FIG. 6B that if g(t)=0 (dashed line), the resulting RAM is still considerably reduced compared to the PM alone (no MZI). A well-balanced MZI could thus be used to decrease RAM without RF signal correction. The RAM has been reduced by a factor ~16 in this situation.

Servo-Locking Scheme

Figure 7:
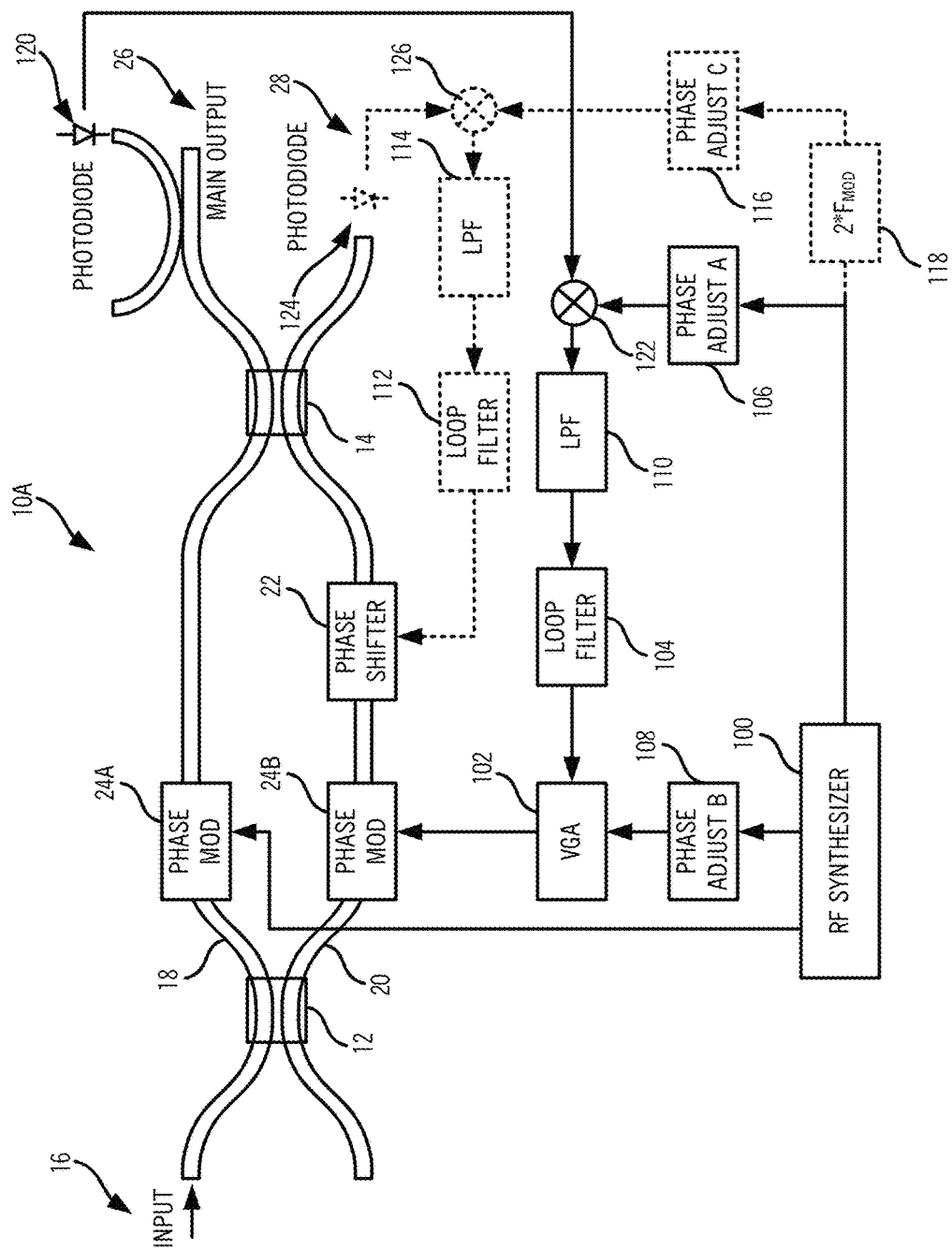
FIG. 7 illustrates a Mach-Zehnder interferometer (MZI) with RAM correction with a servo-locking configuration.

Referring to FIG. 7, in an exemplary embodiment, a diagram illustrates a Mach-Zehnder interferometer (MZI) 10A with RAM correction with a servo-locking configuration. It is assumed that the phase modulation is periodic in time; that is, a sinusoidal electrical signal is used to drive the phase shifting optical element in the main optical path, i.e., the modulator arm 18. In that case, the phase modulation to apply to the correcting beam, i.e., the correction arm 20, will also be sinusoidal. What is to be controlled is the amount of phase modulation on this correcting beam. Note that when the strength of the phase modulation applied to the correcting beam is optimal, the interferometrically combined beams lead to an output optical beam no longer being plagued by RAM but rather displaying a constant optical power. If the strength of the modulating signal is reduced in the correction arm, the resulting output beam will display RAM at the modulation frequency and in phase with the modulation signal. The weaker the modulating signal is, compared to the optimal level, the stronger the RAM will be. On the opposite, when the strength of the modulation signal in the correction arm is larger than the optimal one, the RAM will be out-of-phase with the modulation signal. Also, the stronger the modulation signal is above the optimal level; the stronger the RAM will be.

This behavior can be exploited in a servo-locking configuration. The MZI 10A includes an exemplary servo-locking loop to cancel the RAM. Of course, other embodiments are also contemplated. The servo-locking system includes a first circuit (shown in full lines) used to control the amount of phase modulation in the correction arm 20 and implementing a RF synthesizer 100, a Variable Gain Amplifier (VGA) 102, a loop filter 104, phase adjusters 106, 108, and a Low Pass Filter (LPF) 110. A second circuit (shown in dashed lines) is used to control the relative phase between the optical waves before they are recombined, which requires the following additional components: a loop filter 112, an LPF 114, a phase adjuster 116, and a frequency multiplier 118. Variations in the implementation of this scheme are also possible.

In the servo-locking system, the optical power at the output 26 of the interferometer (after the main beam is combined with the correction beam with the coupler 14) is monitored using a photodetector 120. The photodetector signal is mixed (in an electronic mixer 122) with a signal proportional to the drive signal from the RF synthesizer 100. After low-pass filtering via the LPF 10, the mixer output will contain a DC signal whose amplitude is proportional to the product of the components at the modulating frequency in the two mixed signals, and whose sign is determined by the phase of the signals being mixed.

When the driving signal sent to the correction arm 20 is too small, the two signals being mixed are in-phase, and the mixer will produce a positive voltage. On the other end, when the driving signal is too large, the two signals being mixed are out-of-phase, and the mixer will produce a negative voltage. There thus exists an optimum driving signal strength nulling the mixer 122 output. It is readily seen that the mixer output signal provides an error signal that can be used to correct the strength of the modulating signal in the correcting path. Appropriate filtering of the error signal, using a standard PID (proportional, integrator and derivative) is required on the error signal prior to sending it to the VGA 102 which will set the drive signal for the phase modulator 24B in the correction arm 20 to the optimal value once the servo-loop is closed.

Note that the two signals being mixed (i.e. the signal from the photodetector 120 and the signal proportional to the modulating driving signal) might have traveled an arbitrary distance before being mixed. It is thus necessary to adjust their relative phase in order to maximize the amplitude of the error signal. This phase shifter also serves to adjust the proper polarity at the mixer output so that the servo-locking loop minimizes the RAM when the loop is closed, rather than worsens it. This phase adjustment can be made prior to closing the loop. This servo-loop controlling the strength of the drive signal for the correction path is illustrated in the first circuit.

Mathematically, the two signals being mixed can be expressed as $V_{PD}=V_{DC}+A(P_{RF,opt}-P_{RF})\cos(2\pi f_{mod}t)$ for the signal from the photodetector, and $V_{RF}=BP_{RF}\cos(2\pi f_{mod}t+\phi_{adjust,A})$ for the signal used to drive the modulator (RF synthesizer 100), where $\phi_{adjust,A}$ is the relative phase between those two signals, A and B are proportionality constants, $f_{mod}$ is the modulation frequency, $P_{RF}$ is the RF power sent to the PM in the correction arm and $P_{RF,opt}$ is the RF power that will minimize the RAM. The mixing product will contain a DC term, the error signal (err), and a term oscillating at twice the modulation frequency. The LPF 110 used at the mixer 122 output allows to isolate the desired error signal err=$AB(P_{RF,opt}-P_{RF})\cos(\phi_{adjust,A})$. As can be seen, setting the phase difference of the signals being mixed ($\phi_{adjust,A}=0$) allows to maximize the strength of the error signal.

Regarding the relative phase between the two interfering paths (the main path and the correction path), which needs to be maintained in quadrature (i.e. 90° phase difference), a relatively standard scheme can be used. At the quadrature point, a linear relationship exists between the signal applied to the phase modulator (in either arm) and the intensity at the interferometer output. Inserting a DC-PS 22 in the correction path (not that it could be located in the main path as well), a sinusoidal electrical signal applied to it will produce a sinusoidally varying optical power at the device output. Deviation from the quadrature point will introduce some amount of non-linearity in this relationship, and a component at twice the frequency of the drive signal will be produced. This intensity variation at the second harmonic will be maximal when the relative phase is 0 or 180° (i.e., when the interferometer output is max or min). Furthermore, at those operation points, the second harmonic components in the detected optical output power will be respectively out-of-phase and in-phase with the drive signal. Because the correcting path nulls the variations in the optical output power, those components should not be observable directly in the main output 26 port of the device. Instead, the complementary output port should be used. At that monitor port 28, the intensity variation will also be increased due to the RAM correction scheme. Note that detecting the optical power variations in the monitor port 28 will change the phase of the detected signal by 180°.

Mixing the signal of a photodetector 124 in the complementary port 28 via a mixer 126 with a signal at twice the frequency of the drive signal will produce an error signal after low-pass filtering via the LPF 114. This signal will be zero at the quadrature point (no second harmonic component) and changing sign around that point. This signal can be used to correct the differential phase between the two arms and keep the interferometer in quadrature. Here again, the loop filter 112 needs to be used to close the loop. Also, due to unequal paths traveled by the electrical signals, a phase shifter must be used for either the photodetector 124 signal or the frequency-doubled drive signal. It can be noted that the phase shifting element in the correction path could be the same as the one driven by the sinusoidal signal, providing that the DC (error signal) and AC signals are combined using a bias-tee. This servo-loop controlling the phase difference between the two arms is illustrated in the second circuit.

Note that variations on the exact implementation of the locking scheme could be proposed. The key element here is the control of the strength of the correction signal to minimize the RAM. Servo-locking to maintain the interferometer at the quadrature point can be based on any other appropriate technique.

Although the present disclosure has been illustrated and described herein with reference to preferred embodiments and specific examples thereof, it will be readily apparent to those skilled in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A phase modulator with reduced Residual Amplitude Modulation, the phase modulator comprising:
   a main path;
   a correction path;
   a first coupler configured to split, at a first ratio, an input to the main path and the correction path; and
   a second coupler configured to combine outputs from the main path and the correction path and to split the combined outputs, at a second ratio, with a first output comprising an output of the phase modulator with the reduced Residual Amplitude Modulation,
   wherein the first ratio and the second ratio are set based on one another to provide the reduced Residual Amplitude Modulation on the first output.

2. The phase modulator of claim 1, wherein the correction path has a correction signal with a proper amplitude and phase that, when combined with an output signal from the main path by the second coupler, cancels the Residual Amplitude Modulation from the output signal.

3. The phase modulator of claim 1, wherein a signal on the correction path is unmodulated.

4. The phase modulator of claim 1, wherein a signal on the correction path is modulated with a correction signal that is a fraction of a modulation signal from the main path.

5. The phase modulator of claim 4, wherein the correction signal is adjusted based on a servo locking configuration that controls a strength of a correction signal in the correction path to minimize the Residual Amplitude Modulation in an output signal from the main path.

6. The phase modulator of claim 1, wherein the first ratio is set such that enough power passes through the correction path to enable a correction signal that compensates completely the Residual Amplitude Modulation caused by the main path.

7. The phase modulator of claim 1, wherein a correction signal applied in the correction path is proportional to the main signal in the main path, and wherein the amplitude and phase of the correction signal are adjusted based on monitoring.

8. The phase modulator of claim 1, wherein the first ratio and the second ratio are adjusted to compensate the Residual Amplitude Modulation, without modulation on the correction path.

9. The phase modulator of claim 1, wherein the phase modulator is implemented in silicon photonics.

10. The phase modulator of claim 1, wherein the phase modulator uses a Mach-Zehnder Interferometer.

11. The phase modulator of claim 1, wherein the phase modulator uses a Fabry-Perot Interferometer.

12. The phase modulator of claim 1, wherein the phase modulator is a micro-ring resonator.

13. The phase modulator of claim 1, wherein the main path comprises a phase modulator formed by a PN-junction operating in either a depletion mode and a forward bias mode.

14. A method implemented in a phase modulator for reduced Residual Amplitude Modulation, the method comprising:
    splitting an input to a main path and a correction path at a first ratio;
    performing phase modulation on a main signal in the main path; and
    combining a correction signal from the correction path with the main signal and providing a combined output signal at a second ratio, to provide an output of the phase modulator with the reduced Residual Amplitude Modulation, wherein the first ratio and the second ratio are set based on one another to provide the reduced Residual Amplitude Modulation on the first output.

15. The method of claim 14, wherein the correction signal has a proper amplitude and phase that, when combined with the main signal, cancels the Residual Amplitude Modulation.

16. The method of claim 14, wherein the correction signal is one of
    i) unmodulated, and
    ii) adjusted based on a servo-locking system that controls a strength of the correction signal in the correction path to minimize the Residual Amplitude Modulation in an output signal from the main path.

17. The method of claim 14, wherein the first ratio is set such that enough power passes through the correction path to enable a correction signal that compensates completely the Residual Amplitude Modulation caused by the main path.

18. The method of claim 14, further comprising:
    monitoring the output; and
    adjusting amplitude and phase of the correction signal based on monitoring, wherein the correction signal is proportional to the main signal from the main path.

19. A silicon photonics integrated, Mach-Zehnder interferometer-based phase modulator with reduced Residual Amplitude Modulation, the phase modulator comprising:
    a first coupler adapted to receive an input and split the input at a first ratio;
    a main arm with a PN-junction operating in either a depletion mode and a forward bias mode adapted to receive one output of the first coupler;
    a correction arm adapted to receive another output of the first coupler; and
    a second coupler adapted to combine outputs from the main arm and the correction arm and to split the combined outputs, at a second ratio, with a first output comprising an output of the phase modulator with the reduced Residual Amplitude Modulation, wherein the first ratio and the second ratio are set based on one another to provide the reduced Residual Amplitude Modulation on the first output.

* * * * *